United States Patent [19]

Shu et al.

[11] Patent Number: 4,676,930

[45] Date of Patent: Jun. 30, 1987

[54] ZIRCONIUM CROSSLINKED GEL COMPOSITIONS, METHODS OF PREPARATION AND APPLICATION IN ENHANCED OIL RECOVERY

[75] Inventors: Paul Shu, Princeton Junction; Marie Wszolek, Trenton, both of N.J.

[73] Assignee: Mobile Oil Corporation, New York, N.Y.

[21] Appl. No.: 780,052

[22] Filed: Sep. 25, 1985

[51] Int. Cl.$^4$ .............................. E21B 43/22
[52] U.S. Cl. ................... 252/315.3; 166/274; 166/294; 252/8.554; 523/130; 525/329.4; 525/361; 525/370; 525/371
[58] Field of Search ............ 252/8.55 R, 8.55 D, 252/315.3; 523/130, 131; 525/329.4, 361, 370, 371, 344

[56] References Cited

U.S. PATENT DOCUMENTS

| | | | |
|---|---|---|---|
| 4,324,668 | 4/1982 | Harris | 252/8.55 X |
| 4,460,751 | 7/1984 | Hanlon et al. | 525/371 |
| 4,477,360 | 10/1984 | Almond | 252/8.55 |
| 4,488,975 | 12/1984 | Almond | 252/8.55 |
| 4,534,870 | 8/1985 | Williams | 252/8.55 |
| 4,579,667 | 4/1986 | Echt et al. | 252/8.55 |

Primary Examiner—Herbert B. Guynn
Attorney, Agent, or Firm—Alexander J. McKillop; Michael G. Gilman; Charles J. Speciale

[57] ABSTRACT

Homogeneous, strong and stable zirconium crosslinked gels prepared from a crosslinking composition comprised of a zirconium (IV) compound and a water-soluble compound containing a sulfate or carboxylate anion are provided which are particularly well suited in secondary enhanced oil recovery operations.

13 Claims, No Drawings

ZIRCONIUM CROSSLINKED GEL COMPOSITIONS, METHODS OF PREPARATION AND APPLICATION IN ENHANCED OIL RECOVERY

BACKGROUND OF THE INVENTION

This invention relates to the treatment of a subterranean petroleum formation to enhance oil recovery and more particularly to the treatment of a subterranean petroleum formation, containing two or more zones which differ from one another in permeability, with zirconium gel compositions to enhance oil recovery.

It is well known that only a small fraction of the petroleum present in a subterranean petroleum formation is recoverable by primary production i.e. by allowing the oil to flow to the surface of the earth as a consequence of naturally occurring energy forces. In many instances, secondary waterflooding of many reservoirs recovers only a small portion of the remaining oil because of the presence within the reservoir of a number of strata of widely varying permeability.

In general, secondary recovery processes comprise injecting fluids into the formation via one or more injection wells to displace petroleum through the formation and finally to the surface of the earth. Fluids used in such processes include liquids, such as water and various hydrocarbons and gases, such as carbon dioxide and the like. In all fluid drive processes a recognized problem is the predilection of the drive fluid to pass through the more permeable zones of the formation. The more permeable or conductive zones, after the oil has been largely displaced therefrom, function as thief zones which permit the drive fluid to channel directly from injection to production wells.

To achieve higher sweep efficiency, the permeability of the loose (more permeable) zones must be reduced so that the flooding fluid may invade the previously under-swept less permeable (tight) zones to displace the oil. Various polymer gels have been used for this purpose. One of the most widely employed gel types is the Cr(III) crosslinked polymer containing carboxylate groups, such as Cr-partially hydrolyzed polyacrylamide gels and Cr-xanthan biopolymer gels.

In a recent patent, namely U.S. Pat. No. 4,460,751, certain zirconium (IV) type gels are disclosed as being useful to achieve higher sweep efficiency in secondary oil recovery processes. Zirconium is reported to be nontoxic and in addition, Zr(IV) is known to interact strongly with carboxylate groups to form complexes which are more stable than those formed by using Cr(III). Thus, gels capable of withstanding higher temperatures than chromium gels may be prepared from zirconium crosslinking.

Notwithstanding their apparent advantages, zirconium gels are difficult to prepare. For example, reacting Zr(IV) reagents with carboxylate containing polymers can result in lumpy and heterogeneous gels of undesired morphology. Within such gels, regions of high crosslinking density are formed which may eventually lead to the destruction of the gel structure.

In said U.S. Pat. No. 4,460,751, strong complexing agents, such as alpha-hydroxy-carboxylic acids and alkanol amines are added to Zr(IV) reagents to retard the gelation reaction by masking portions of the reactive sites of the zirconium reagents. While this technique reduces the reactivity of the zirconium reagents and allows the zirconium reagents to be dispersed evenly to form stable gels without precipitation, it is found that the effectiveness of the zirconium is reduced and a higher initial zirconium concentration is required to offset the reactivity lost by the added retardants.

Thus, it is apparent that a permeability reducing crosslinked gel composition, wherein the advantages of the use of zirconium are realized, and wherein there is rapid gelation of the polymer without the need for high concentrations of zirconium, is desirable.

SUMMARY OF THE INVENTION

Accordingly, it is one object of the present invention to provide a novel process for the treatment of subterranean petroleum formations to enhance oil recovery.

Another object of this invention is to provide a process for controlling the permeability of subterranean formations to enhance oil recovery.

Still another object of the present invention is to provide an improved crosslinked polymeric gel utilizing an improved zirconium (IV) crosslinked composition formed rapidly at low zirconium concentrations for use in the treatment of subterranean petroleum formations to control the permeability thereof and increase oil recovery therefrom.

A further object of this invention is to provide an improved zirconium crosslinked gel, useful for controlling the permeability of a subterranean formation, which maintains its effectiveness over a longer period and which withstands large volumes of brine flush.

These and other objects are accomplished herein by providing a novel aqueous crosslinking composition comprising:

(a) a water-soluble zirconium (IV) compound; and
(b) a water-soluble compound selected from the group consisting of a compound containing a sulfate ($SO_4^=$) anion, a compound containing a carboxylate ($RCOO^-$) anion and mixtures thereof, wherein R is lower alkyl.

The objects of the present invention are further realized by providing an aqueous crosslinkable, gelling composition comprising:

(a) a water dispersible hydrophilic organic polymer having a molecular weight greater than about 200,000 and containing carboxyl functionality;
(b) a water-soluble zirconium (IV) compound; and
(c) a water-soluble compound selected from the group consisting of a compound containing a sulfate ($SO_4^=$) anion, a compound containing a carboxylate ($RCOO^-$) anion and mixtures thereof, wherein R is lower alkyl.

The objects of this invention are further accomplished herein by providing a process for controlling the permeability of a subterranean formation by contacting the formation with an aqueous mixture comprising:

(i) a water dispersible organic polymer having a minimum molecular weight of about 200,000 and containing carboxyl functionality and
(ii) an aqueous crosslinking composition comprising:
(a) a water-soluble zirconium (IV) compound; and
(b) a water-soluble compound selected from the group consisting of a compound containing a sulfate ($SO_4^=$) anion, a compound containing a carboxylate ($RCOO^-$) anion and mixtures thereof, wherein R is lower alkyl.

DETAILED DESCRIPTION OF THE INVENTION

In accordance with the present invention, it has been surprisingly discovered that homogeneous, strong and stable zirconium crosslinked gels can be rapidly prepared at room temperature and low concentrations of zirconium and crosslinkable polymer by incorporating small quantities of sulfate ion and/or carboxylate ion in the crosslinking composition.

The zirconium compound used in the crosslinking composition has a +4 valence. Thus, the zirconium crosslinking agent useful in the practice of the present invention can be any of the water soluble Zr(IV) inorganic or organic compound such as the normal salts and basic salts e.g. zirconium sulfate, zirconium tetrachloride, zirconium orthosulfate, zirconium oxychloride, zirconium carbonate, zirconium ammonium carbonate and mixtures thereof and organo-zirconium compounds e.g. zirconium acetate, zirconium acetylacetonate and the like and mixtures thereof. The quantity of zirconium (IV) compound used in the crosslinking composition of the present invention may vary over a wide range, but is considerably less than is required for satisfactory results in prior art compositions. For example, amounts employed herein are in the range of from about 10 to about 500 ppm or about 0.001 to about 0.05 weight percent based on final composition of the gel.

As stated hereinabove, it has been found herein that the presence of small amounts of sulfate or carboxylate reaction moderators in the crosslinking composition not only assist to provide homogeneous, strong and stable gels in a short time, but the problems of lumpy and heterogeneous gels having non-uniform high crosslinking density are also alleviated.

The sulfate or oarboxylate moderators useful in the present invention may be any water-soluble sulfate or carboxylate containing compound and may be used in salt or free acid forms. Thus, typical sulfates for purposes herein include, alkali metal sulfates such as sodium sulfate, magnesium sulfate, alkaline earth sulfates such as calcium sulfate or other water-soluble sulfates. Free sulfuric acid is also contemplated herein. Typical carboxylate containing compounds for the purposes herein have carboxylate groups having the general formula

$$\underset{RCO^-}{\overset{O}{\underset{\|}{}}}$$

wherein R is lower alkyl for example from 1 to about 6 carbon atoms. More specifically, carboxylate containing compounds useful herein include water-soluble alkali metal acetates, propionates, butyrates, etc. and alkaline earth metal acetates, propionates, butyrates, etc. Free carboxylic acids such as acetic, propionic, butyric and the like are also contemplated herein. Other water-soluble carboxylates are also contemplated herein. Sodium acetate is preferred. Amounts employed are generally in the range of from about 0.01 wt. % to about 5 wt. % of the gels. In the preparation of the gels, these moderators can be added either to the polymer solution or directly with the zirconium (IV) reagent.

The term water is used herein to include brines and fresh water. Thus, the polymer solutions and/or the crosslinking solutions can be prepared with either fresh water or brine by any suitable procedures for preparing solutions.

In general, the crosslinkable polymers which are suitable for the present invention can be described as water dispersible hydrophilic organic polymers having a molecular weight greater than about 200,000 and containing carboxyl functionality (preferably at least two carboxyl groups per molecule) whereby the polymers can be gelled or crosslinked with zirconium compounds having a valence of +4. The term polymer is employed herein generally to include both homopolymers and copolymers and the term water-dispersible polymers is employed to include those polymers which are truly water-soluble or brine soluble and those polymers which are dispersible in water and other aqueous medium such as brines to form stable colloidal suspensions which can be gelled as described herein.

More specifically, water-dispersible polymers which are suitable in the practice of the present invention include, carboxyalkyl guar wherein the alkyl group has 1 to about 3 carbon atoms, carboxyalkylhydroxyalkyl guar wherein the alkyl group has 1 to 3 carbon atoms, xanthan gum, polyacrylamides and polymethylacrylamides and their copolymers either in anionic or cationic forms wherein from about 1 to about 33 percent of the polyacrylamide and polymethacrylamide are hydrolyzed to carboxyl groups; cellulose ether polymers containing carboxyl functionality and copolymers resulting from the polymerization of acrylamide or methacrylamide and their sulfonate and quaternary ammonium derivatives with acrylic acid and/or methacrylic acid.

The polymers used in the present invention are preferably substantially free of crosslinking between the polymer chains. As used herein and in the claims, unless otherwise specified, the term "hydrolyzed" includes modified polymers wherein the carboxyl groups are in the acid form and also polymers wherein the carboxyl groups are in the salt form, provided such salts are water dispersible. Such salts include ammonium salts, alkali metal salts, and others which are water dispersible. Hydrolysis can be carried out in any suitable fashion, for example, by heating an aqueous solution of the polymer with a suitable amount of sodium hydroxide.

Examples of cellulose ethers which can be used to carry out the invention include, for example, carboxyalkyl cellulose ethers such as carboxymethyl cellulose (CMC), and mixed ethers such as carboxyalkylhydroxyalkyl cellulose ethers such as carboxymethylhydroxyethyl cellulose (CMHEC). Many of these cellulose ethers that contain carboxyl functionality are commercially available and are available as the alkali metal salt, usually the sodium salt. The metal is seldom referred to and they are commonly referred to as CMC or CMHEC.

The copolymers of acrylic acid, methacrylic acid or combinations thereof with acrylamide, methacrylamide and their sulfonate, quaternary ammonium derivatives or combinations thereof are made up with from about 1 to 70 mole percent of acrylic acid, methacrylic acid and combinations thereof and most preferably from about 1 to about 33 mole percent of acrylic acid, methacrylic acid and combinations thereof.

Included among the polyacrylamides that can be used in the present invention are polyacrylamides and related polymers which are water soluble. Presently preferred polymers include homopolymers and copolymers of acrylamide and methacrylamide. These polymers can contain from about 1 to about 70 mole percent and preferably about 1 to about 33 mole percent of the carboxamide groups hydrolyzed to carboxyl groups.

The most preferred polymer for carrying out the method of the invention is polyacrylamide wherein about 1 percent to about 33 mole percent of the carboxamide groups are hydrolyzed to carboxyl groups. The precise preferred amount of carboxyl functionality will depend on the subterranean formation to be treated.

Mixtures of the above-described polymers can be used in the practice of the invention. While the polymers should have a molecular weight of at least 200,000, the upper limit of the molecular weight is not critical as long as the polymer is water dispersible and the aqueous gel prepared therefrom can be pumped. Thus, polymers having a molecular weight as high as 20 million or higher, in many said conditions can be used.

The amount of the polymers used in the practice of the invention can vary widely depending on the particular polymer desired, purity of the polymer, and the properties desired in the gels. Generally speaking, amounts in the range of from about 0.01 to about 10, preferably from about 0.05 to about 5 weight percent based on the weight of water can be used. Amounts outside this range, however, can be used. Small amounts of polymer will usually produce liquid mobile gels which can be readily pumped where as large amounts of polymer will usually produce thick, viscous, some what elastic gels. The thick gels can be thinned by the dissolution of water to any desired concentration of polymer and this can be done by mechanical means such as stirring, pumping, or by means of a suitable turbulence inducing device to cause shearing such as a jet nozzle. The precise concentration used is generally determined by the particular field conditions, such as the permeability ranges of various strata and their ratio. Thus, there is really no fixed upper limit on the amount of polymer which can be used.

In practicing the secondary oil recovery process of the present invention, in one embodiment after initial brine injection, a mixture of polymer solution and crosslinking solution is injected through a well into the subterranean formation. The mixture is directed to that portion of the subterranean formation where it is desired that the permeability be altered. After shutting off the well, for example, for about 16 to about 48 hours, brine injection is resumed.

The following specific examples are presented for purposes of illustration, and are not intended to limit the scope of the present invention.

EXAMPLE 1

| Polymer* | Zr (IV) Reagent** | NaOCOCH$_3$ (wt %) | Na$_2$SO$_4$ (wt %) | Gel Time (seconds) |
|---|---|---|---|---|
| Polyacrylamide (about 1% hydrolyzed) | Zr Ortho-sulfate | 0.1 | — | 15 |
| | | 1 | — | 10 |
| | | — | 0.1 | 10 |
| | | — | 1 | 5 |
| | Zr Sulfate | 0.1 | — | 30 |
| | | 1 | — | 30 |
| | | — | 0.1 | 10 |
| | | 0 | 1 | 10 |
| | Zr Acetate | 0.1 | — | 15 |
| | | 1 | — | 15 |
| | | — | 0.1 | 30 |
| | | — | 1 | 20 |
| Xanthan | Zr Ortho-sulfate | 0.1 | — | Instant |
| | | 1 | — | " |
| | Zr Sulfate | 0.1 | — | " |

-continued

| Polymer* | Zr (IV) Reagent** | NaOCOCH$_3$ (wt %) | Na$_2$SO$_4$ (wt %) | Gel Time (seconds) |
|---|---|---|---|---|
| | | 1 | — | " |
| | Zr Acetate | 0.1 | — | " |
| | | 1 | — | " |

*2000 ppm in 2% NaCl
**45 ppm in Zr

The gels were prepared by mixing a solution of the polymer with a solution of the zirconium reagent and the sulfate or acetate moderator. Alternatively, the gels can be prepared by mixing a solution of the polymer and the sulfate or carboxylate moderator with a solution of the zirconium (IV) crosslinking agent.

All gelation occurred in 15-30 seconds for $SO_4^{2+}$ and $CH_3COO^-$ at 0.1%. At 1% of $SO_4^{2-}$ and $CH_3COO^-$, gel formation occurs in only 5 to 20 seconds. The gels prepared were all homogenous and stable. Accordingly, the advantage of rapid gelation at low zirconium concentration is clearly deomonstrated.

EXAMPLE 2

Parallel Sandpack Brine Water Diversion Process

Two identical stainless steel tubes with dimensions of 30.6 cm×0.93 cm ID were packed with Berea sands. The high permeability column (No. 1) was prepared by packing with coarse sand and the low permeability (No. 2) column was prepared by packing with fine sand. Typical permeability contrast of loose sandpack to tight sandpack was about 5-200. Two sandpacks were connected in parallel and kept at 80° C. with an ethylene glycol bath. Initial flow ratios ($Q_1/Q_2$), of the two sandpacks were obtained by injecting 2% NaCl. One pore volume of gel was then injected to modify the sandpacks permeability. Brine injection was resumed after the gel treated sandpacks were shut in for 16 hours. The flow ratio ($Q_1/Q_2$), the pressure drop across the sandpacks $\Delta P$, and time were monitored for a period of six (6) days. The ratio of $(Q_1/Q_2)_B$ before gel treatment and the overall $(Q_1/Q_2)_A$ after the gel treatment was used to judge the gel's effectiveness. Experimental results are summarized in Table 2. The high ratio indicates high gel flow altering efficiencies. The gels prepared from 1500 ppm polyacrylamide/23 ppm Zr acetate/0.5% Na acetate, and 2000 ppm xanthan/90 ppm (Zr(SO$_4$)$_2$)/0.1% Na-acetate were very effective in flow alteration as indicated by the high ratios.

TABLE 2

Dual Parallel Sandpack Flow Pattern Alteration by Gel Treatment

| Gel Composition | Flow Ratio Q1/Q2 (Initial) | Flow Ratio Q1/Q2 (Gel Treated) | Flow Altering Effectiveness | Total Pore Volume Brine Flood |
|---|---|---|---|---|
| Xanthan: 2000 ppm Zr: 90 ppm (sulfate) Na acetate: 0.1% NaCl: 2% | 163:1 | 1.16 | 140 | 15 |
| Polyacrylamide (about 1% hydrolyzed): 1500 ppm Zr: 23 ppm (acetate) Na acetate: 0.5% | 5.6 | 0.21 | 27 | 15 |

TABLE 2-continued

Dual Parallel Sandpack
Flow Pattern Alteration by Gel Treatment

| Gel Composition | Flow Ratio Q1/Q2 (Initial) | Flow Ratio Q1/Q2 (Gel Treated) | Flow Altering Effectiveness | Total Pore Volume Brine Flood |
|---|---|---|---|---|
| NaCl: 2% | | | | |

This dual parallel sandpack study shows that:
(1) the zirconium crosslinked gels of the present invention are very effeotive in altering the flow;
(2) the gels maintain their effectiveness over a long period; and
(3) the gels withstand a large volume of brine flush.

Obviously, other modifications and variations of the present invention are possible in the light of the above teachings. It is, therefore, to be understood that changes may be made in the particular embodiments of this invention which are within the full intended scope of the invention as defined by the appended claims.

We claim:

1. An aqueous crosslinking composition useful in the preparation of an aqueous crosslinkable gelling composition, said aqueous crosslinking composition comprising:
   (a) a water-soluble zirconium (IV) compound;
   (b) a water-soluble salt selected from the group consisting of an alkali metal or alkaline earth metal sulfate an alkali metal or alkaline earth metal salt of acetic, propionic or butyric acid and mixtures thereof; and
   (c) water.

2. The composition according to claim 1 wherein said acid is acetic.

3. The composition according to claim 1 wherein said water soluble zirconium (IV) compound is selected from the group consisting of zirconium sulfate, zirconium tetrachloride, zirconium orthosulfate, zirconium oxychloride, zirconium acetate, zirconium carbonate, zirconium ammonium carbonate, zirconium acetylacetonate and mixtures thereof.

4. The composition according to claim 1 wherein said salt is selected from the group consisting of an alkali metal sulfate, alkali metal acetate, alkaline earth metal sulfate, alkaline earth metal acetate and mixtures thereof.

5. The composition according to claim 1 wherein said zirconium (IV) compound is selected from the group consisting of zirconium orthosulfate, zirconium sulfate and zirconium acetate and said salt is selected from the group consisting of sodium sulfate, sodium acetate and mixtures thereof.

6. An aqueous crosslinked gel composition comprising
   (a) a water dispersible hydrophilic organic polymer having a molecular weight greater than about 200,000 and containing carboxyl functionality;
   (b) a water-soluble zirconium (IV) compound;
   (c) a water soluble compound selected from the group consisting of an alkali metal or alkaline earth metal sulfate, an alkali metal or alkaline earth metal salt of acetic, propionic or butyric acid and mixtures thereof, and
   (d) water.

7. The composition according to claim 6 wherein said zirconium (IV) compound is present in an amount from about 0.001 to about 0.05 weight percent based on the composition of the gel.

8. The composition according to claim 6 wherein said salt is present in an amount of from about 0.01 to about 5 weight percent based on the composition of the gel.

9. The composition according to claim 6 wherein said water dispersible hydrophilic organic polymer is selected from the group consisting of xanthan gum, polyacrylamide wherein from about 1 to about 33 mole percent of the carboxamide groups are hydrolyzed to carboxyl groups, polymethacrylamide wherein from about 1 to about 33 mole percent of the carboxamide groups are hydrolyzed to carboxyl groups, cellulose ethers, a copolymer of about 1 to about 33 mole percent by weight acrylic acid or methacrylic acid copolymerized with acrylamide or methacrylamide and mixtures thereof.

10. The composition according to claim 6 wherein said water dispersible hydrophilic organic polymer is selected from the group consisting of xanthan gum, partially hydrolyzed polyacrylamide and partially hydrolyzed polymethacrylamide and said sulfate salt or carboxylate salt is selected from the group consisting of sodium sulfate, sodium acetate and mixtures thereof.

11. The composition according to claim 6 wherein the water-soluble zirconium (IV) compound is selected from the group consisting of zirconium sulfate, zirconium tetrachloride, zirconium orthosulfate, zirconium oxychloride, zirconium carbonate, zirconium ammonium carbonate, zirconium acetate and mixtures thereof.

12. The composition according to claim 6 wherein said water dispersible hydrophilic organic polymer is selected from the group consisting of xanthan gum, partially hydrolyzed polyacrylamide and partially hydrolyzed polymethyacrylamide.

13. The composition according to claim 6 wherein said salt is selected from the group consisting of sodium sulfate, sodium acetate and mixtures thereof.

* * * * *